United States Patent
Gopal et al.

(10) Patent No.: US 8,250,195 B2
(45) Date of Patent: Aug. 21, 2012

(54) LEVERAGING SYNCHRONOUS COMMUNICATION PROTOCOLS TO ENABLE ASYNCHRONOUS APPLICATION AND LINE-OF-BUSINESS BEHAVIORS

(75) Inventors: Burra Gopal, Redmond, WA (US); David Koronthaly, Sammamish, WA (US); Rolando Jimenez Salgado, Redmond, WA (US); Diwakar Mantha, Gachibowli (IN); Manish Soni, Arunodaya Colony (IN)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 12/208,138

(22) Filed: Sep. 10, 2008

(65) Prior Publication Data

US 2010/0064105 A1    Mar. 11, 2010

(51) Int. Cl.
*G06F 15/173* (2006.01)
(52) U.S. Cl. ......... 709/223; 709/224; 709/225; 709/226
(58) Field of Classification Search .............. 709/223
See application file for complete search history.

(56) References Cited

U.S. PATENT DOCUMENTS

| | | | |
|---|---|---|---|
| 6,505,200 B1 | 1/2003 | Ims et al. | 707/8 |
| 6,816,904 B1 * | 11/2004 | Ludwig et al. | 709/226 |
| 7,219,304 B1 | 5/2007 | Kraenzel et al. | 715/755 |
| 2002/0147611 A1 * | 10/2002 | Greene et al. | 705/1 |
| 2005/0108274 A1 | 5/2005 | Selman et al. | 707/102 |
| 2006/0165040 A1 | 7/2006 | Rathod et al. | 370/335 |
| 2007/0067354 A1 | 3/2007 | Mullender et al. | 707/201 |
| 2007/0078667 A1 | 4/2007 | Chand et al. | 705/1 |

OTHER PUBLICATIONS

"Extending Enterprise Applications with Microsoft Outlook: Architectural Design Guide," http://msdn.microsoft.com/en-us/library/aa479348.aspx, Jan. 2006, 14 pgs.

"Microsoft Unveils Office Business Application Strategy, Marrying Enterprise Applications with Microsoft Office," http://www.microsoft.com/presspass/press/2006/jun06/06-12OBAPR.mspx, Jun. 2006, 3 pgs.

"What are Office Business Applications (OBA)?", https://www.obacentral.com/newtooba.aspx, 2 pgs.

Javed Sikander, "Building Office Business Applications: A New Breed of Business Applications Built on the 2007 Microsoft Office System," http://msdn.microsoft.com/en-us/library/aa479072.aspx, Jun. 2006, 12 pgs.

* cited by examiner

*Primary Examiner* — Hussein Elchanti
*Assistant Examiner* — Maceeh Anwari
(74) *Attorney, Agent, or Firm* — Merchant & Gould (57) ABSTRACT

Methods and systems of leveraging synchronous communication protocols to enable asynchronous application and line of business behaviors. An application platform may be provided and configured to provide a pending state for any synchronous operation. The pending state may indicate that the operation has not been completed yet. For an application which may know how to track an operation that has a pending state, the application may control when the operation enters and exits the pending state. The application may communicate to the application platform to hold off on other operations dependent upon the pending operation when the pending operation is not complete. For an application which does not know how to track an operation that has a pending state, the application platform may ignore the pending state of the operation and proceed to other operations. Accordingly, the synchronous user experience is preserved where a straightforward, down-level user interface and experience is appropriate. The user interface and experience is also extended when an application knows how to interpret and present the asynchronous nature of various underlying systems.

16 Claims, 6 Drawing Sheets

LEVERAGING SYNCHRONOUS COMMUNICATION PROTOCOLS TO ENABLE ASYNCHRONOUS APPLICATION AND LINE-OF-BUSINESS BEHAVIORS

BACKGROUND

When an operation is performed in software applications, the operation may typically either succeed or fail immediately. This behavior may be called a synchronous application behavior. However, there are many cases of asynchronous application behaviors in software applications as well. In such cases, the application may not complete synchronously as soon as a user takes a particular operation. For example, when working with collaborative or line of business ("LOB") systems, a software application tends to be structured in a more complex manner. The application may trigger a workflow that is routed to multiple users via a collaboration server. The application may also trigger a workflow over a LOB system. In addition, many operations on a LOB system inherently take a "long" time because many interconnected systems need to work in serial to get the entire LOB system to behave appropriately.

There may be LOB and collaborative systems/applications that understand the inherent asynchronous nature of the information and processes they are dealing with, and build the asynchronous behaviors into their user experience. However, those systems/applications are perceived as complex and difficult to use. Therefore, there is a need to enable asynchronous data-exchange and business-processes by building on top of and extending existing underlying communication protocols that are inherently synchronous.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by leveraging synchronous communication protocols to enable asynchronous application and line of business behaviors. According to one embodiment, an application platform may be provided and configured to provide a pending state for any synchronous operation. The pending state indicates that the operation has not been completed yet. For an application which knows how to track an operation that has a pending state, the application may control when the operation enters and exits the pending state. The application may communicate to the application platform to hold off on those operations dependent upon the pending operation because the pending operation is not complete. For an application which does not know how to track an operation that has a pending state, the application platform may ignore the pending state of the operation and proceed to other operations. Accordingly, the synchronous user experience is preserved where a straightforward, down-level user interface and experience is appropriate. Further, the user interface and experience is extended when an application knows how to interpret and present the asynchronous nature of various underlying systems.

According to one embodiment, a data provider interface may be provided for an application to update locally cached authoritative data when the application knows events that may affect the authoritative data and when the authoritative data from a LOB system is available.

According to another embodiment, an application may be configured to introduce exceptions corresponding to out-of-band changes. The out-of-band changes are changes or events that are outside the control of an application or an application platform. The out-of-band exceptions may have custom exception handling logic to process the out-of-band changes. Exception-handler codes may be provided for the exceptions such that an exception handler can be invoked even when the entire application itself is not currently running.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to leveraging synchronous communication protocols to enable asynchronous application and line of business behaviors. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
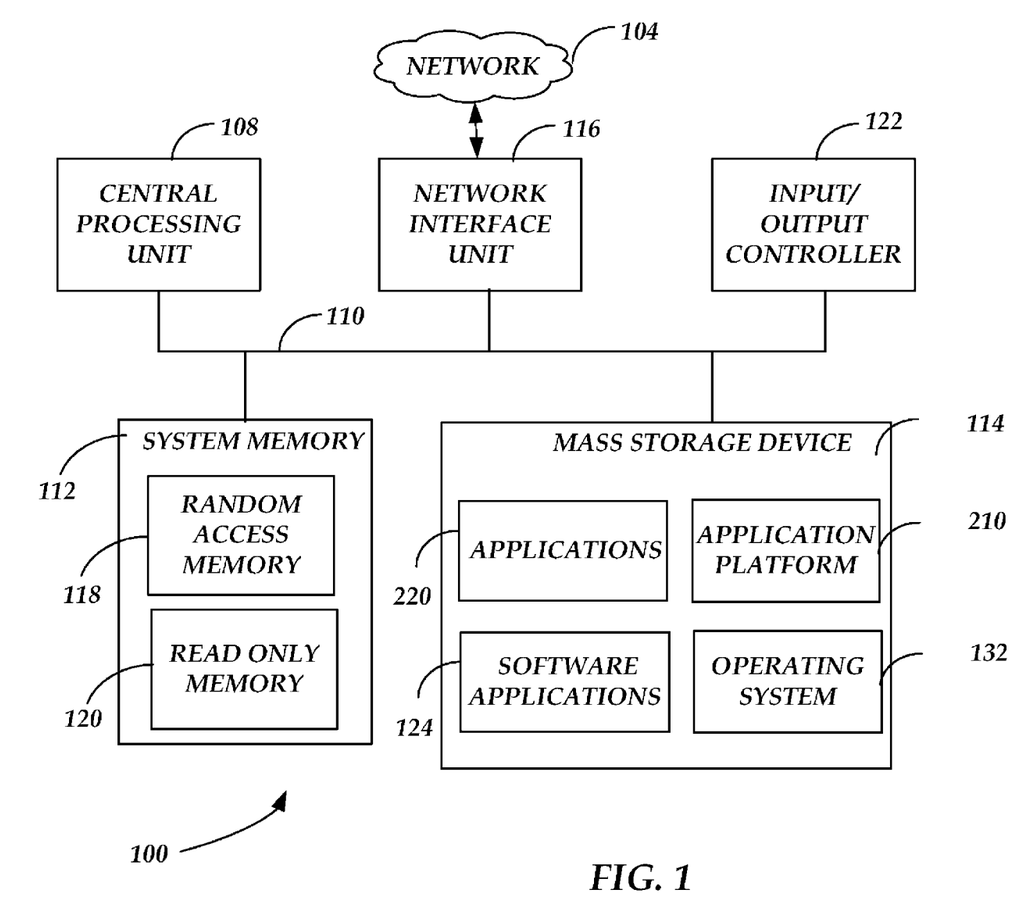
FIG. 1 is a simplified block diagram of an example computing operating environment in which embodiments of the present invention may be practiced.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. In addition, the invention may be practiced in an Internet web-based environment where components of the invention, including rich client user interface components, described and illustrated herein, may be hosted in a website remote from users of the components of any given embodiment of the invention.

Referring now to FIG. 1, an illustrative operating environment for embodiments of the invention will be described. As shown in FIG. 1, computer 100 comprises a general purpose desktop, laptop, handheld, mobile or other type of computer (computing device) capable of executing one or more application programs. The computer 100 includes at least one central processing unit 108 ("CPU"), a system memory 112, including a random access memory 118 ("RAM") and a read-only memory ("ROM") 120, and a system bus 110 that couples the memory to the CPU 108. A basic input/output system containing the basic routines that help to transfer information between elements within the computer, such as during startup, is stored in the ROM 120. The computer 102 further includes a mass storage device 114 for storing an operating system 132, application programs, and other program modules.

The mass storage device 114 is connected to the CPU 108 through a mass storage controller (not shown) connected to the bus 110. The mass storage device 114 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed or utilized by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments of the invention, the computer 100 may operate in a networked environment using logical connections to remote computers through a network 104, such as a local network, the Internet, etc. for example. The computer 100 may connect to the network 104 through a network interface unit 116 connected to the bus 110. It should be appreciated that the network interface unit 116 may also be utilized to connect to other types of networks and remote computing systems. The computer 100 may also include an input/output controller 122 for receiving and processing input from a number of other devices, including a keyboard, mouse, etc. (not shown). Similarly, an input/output controller 122 may provide output to a display screen, a printer, or other type of output device.

As mentioned briefly above, a number of program modules and data files may be stored in the mass storage device 114 and RAM 118 of the computer 100, including an operating system 132 suitable for controlling the operation of a networked personal computer, such as the WINDOWS® operating systems from Microsoft Corporation of Redmond, Wash. The mass storage device 114 and RAM 118 may also store one or more program modules. In particular, the mass storage device 114 and the RAM 118 may store application programs, such as a software application 124, for example, a word processing application, a spreadsheet application, a slide presentation application, a database application, etc.

The mass storage device 114 and the RAM 118 may store an application platform 210. The mass storage device 114 and the RAM 118 may also store applications 220. According to embodiments of the present invention, an example of a suitable application 220 is DUET developed by MICROSOFT CORPORATION and SAP.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 2:
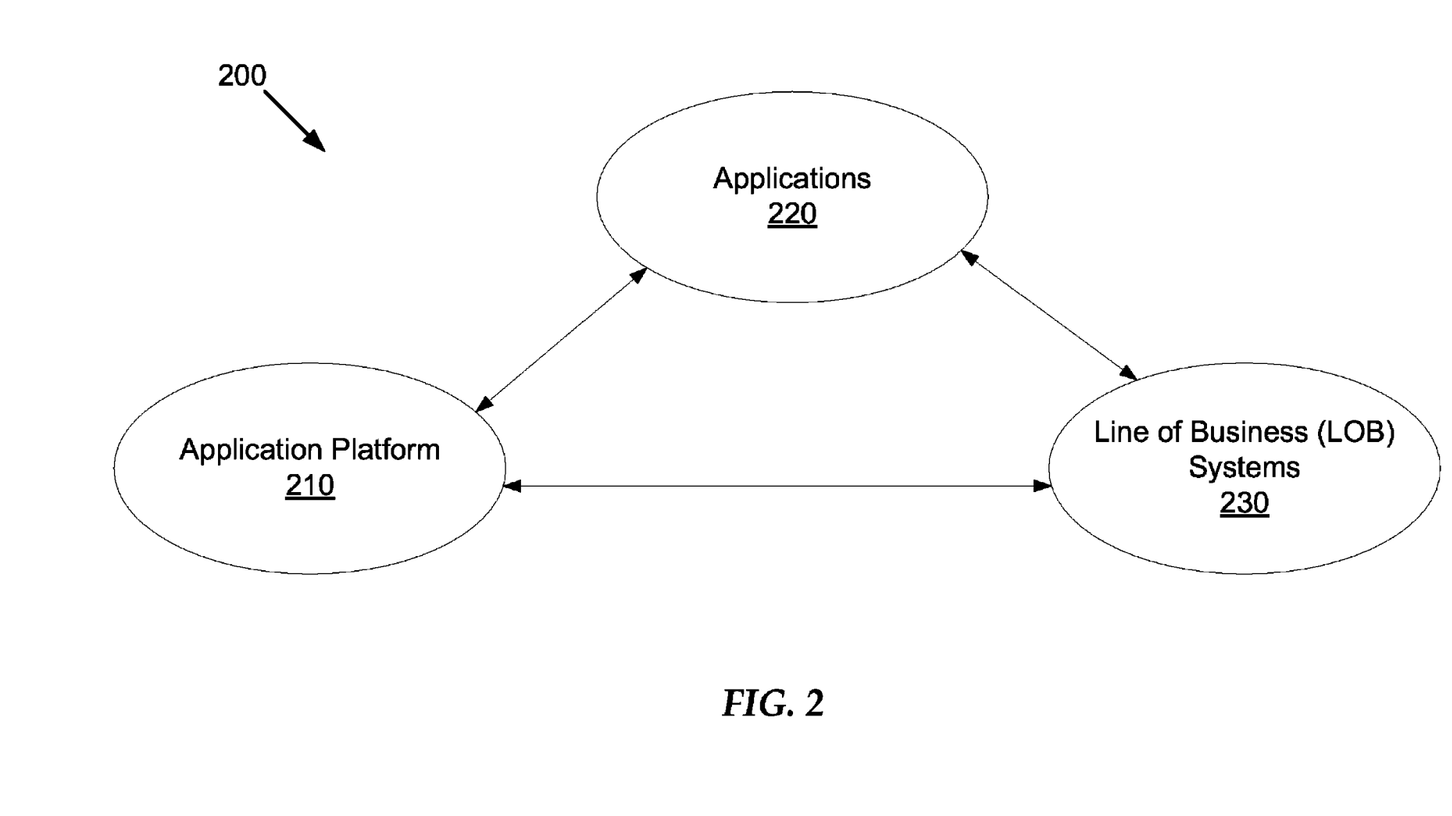
FIG. 2 is a simplified illustration of leveraging synchronous communication protocols to enable asynchronous application and LOB behaviors.

FIG. 2 is a simplified illustration of leveraging synchronous communication protocols to enable asynchronous application and LOB behaviors. An example system 200 is used to illustrate the use-case of this invention. There are many other use-cases for asynchronous application and LOB behaviors which may be applied to the present invention. As should be appreciated, description of the present invention in terms of a specific example is for purposes of illustration only and is not limiting of the vast numbers of applications and systems for which embodiments of the present invention may be utilized.

In the example system 200, an application platform 210 may be arranged and configured to provide productivity services and tools for software developers to build and deploy applications 220 to surface and access information and processes of LOB systems 230.

Applications 220 may be built upon the application platform 210. The applications 220 may be software applications that provide one or more useful software application modules, or the applications 220 may be a software application suite that provides one or more useful software application modules (or, individual software applications). An example of a suitable application 220 is OFFICE manufactured by MICROSOFT CORPORATION that provides multiple software application modules/applications such as WORD (document objects), EXCEL (spreadsheet objects), POWERPOINT (slide presentation objects), and ACCESS (database objects). Another example of a suitable application 220 is OUTLOOK manufactured by MICROSOFT CORPORATION that provides multiple software application modules/applications for creating and editing various objects, for example, emails tasks, contacts and appointments. A suitable application 220 may be a single application that provides one or more useful application modules. For example, the application 220 may be a word processing application, such as MICROSOFT WORD, that provides one or more modules for preparing and editing different types of objects (e.g., resume document module, letter document module, memorandum document module, and the like).

Applications 220 may be developed to combine the productivity tools in the application platform 210 with information and processes defined in the LOB systems 232 so that a user may surface and access the information and processes in familiar user interfaces and environments of the application platform 210. For example, an application 220 may be developed for combining the productivity tools of a spreadsheet application, such as MICROSOFT EXCEL, with an associated LOB 230 (e.g., a quarterly sales management module) for accessing and surfacing in the spreadsheet application and its associated user interface information from the LOB 230. An example of a suitable application 220 may be DUET developed by MICROSOFT CORPORATION and SAP.

The applications 220 may initiate operations to be run in the LOB systems 230. Many operations on a LOB system 230, e.g., changing the discount percent on a product line item/SKU, or changing the address of an employee, etc., inherently take a "long" time because many interconnected systems need to work in serial to get the entire LOB system 230 to behave appropriately. In addition, batch processing is a well-known technique used in a LOB system 230. The requests from various sources are processed in batches, and responses are sent out in batches as well. The responses may therefore take a long time to come back, and are not immediate. A LOB system 230 may also expose actions that trigger analytical computation and creates summaries of results that are presented to a user. Analytical computations and report generation are inherently computationally expensive, and are usually scheduled to run at specific intervals only. The analytical computations and report generation therefore take a long time to come back to the application 220.

When working with collaborative or LOB systems, the application itself 220 may be structured in a more complex manner. The application 220 may trigger or participate in a workflow that is routed to multiple users via a collaboration server. The application 220 may also trigger a workflow over a LOB system 230. In all such cases, the application 220 which natively understands the entire work may not complete synchronously as soon as a user takes a particular action on a particular client.

An application 220 may sometimes change the version of the objects it is dealing with. A version change is a big step since it may require a data/metadata update or migration, which is expensive. During this process, changes to that object may have to be blocked or kept as pending.

Some applications 220 may need to get an integrated view of the whole system after making many related changes. For example, one application may submit many purchase orders, another application may update discount percentages of multiple line-items/SKUs, and yet another application may change the overall organization budget, etc. In such cases, it may make sense for an application to get a snapshot of the state of the system after all the above pending changes are reconciled, and disallow any further changes until the whole system reaches a steady state.

The application platform 210 may generate a pending state for any synchronous operation in the application platform 210. The pending state may indicate that the operation has not been completed yet. The application 220 may control when the operation enters the pending state. The application 220 may communicate to the application platform 210 when it wants entering the pending state to happen. The application platform 210 may not necessarily figure it out on its own. The application 220 may also control when the operation exits the pending state and becomes either successful or failed. Finally, the application 220 may specify a pre-determined time-out period of how long a synchronous operation can remain in a pending state. After the pre-determined time-out period expires, the application platform 210 may automatically fail the pending operation. This is essentially for error handling and cleanup so that the application platform 210 may not be flooded with large numbers of incomplete pending operations.

Advantageously, the system 200 may enable asynchronous data-exchange and business-processes by building on top of and extending existing underlying communication protocols that are inherently synchronous. Specifically, according to one embodiment, for an application 220 that knows how to track an operation that has a pending state, the application 220 may communicate to the application platform 210 to hold off on operations which are dependent upon the pending operation. The application 220 may allow the application platform 210 to block a certain operation that depends on the pending operation, and to make progress with other operations that do not depend on the pending operation. For an application 220 that does not know how to track an operation that has a pending state, the application platform 210 may then ignore the pending state of the operation and proceed to other operations. Accordingly, the synchronous user experience is preserved where a straightforward, down-level user interface and experience is appropriate. Further, the user interface and experience is extended when applications know how to interpret and present the asynchronous nature of various underlying systems.

Figure 3:
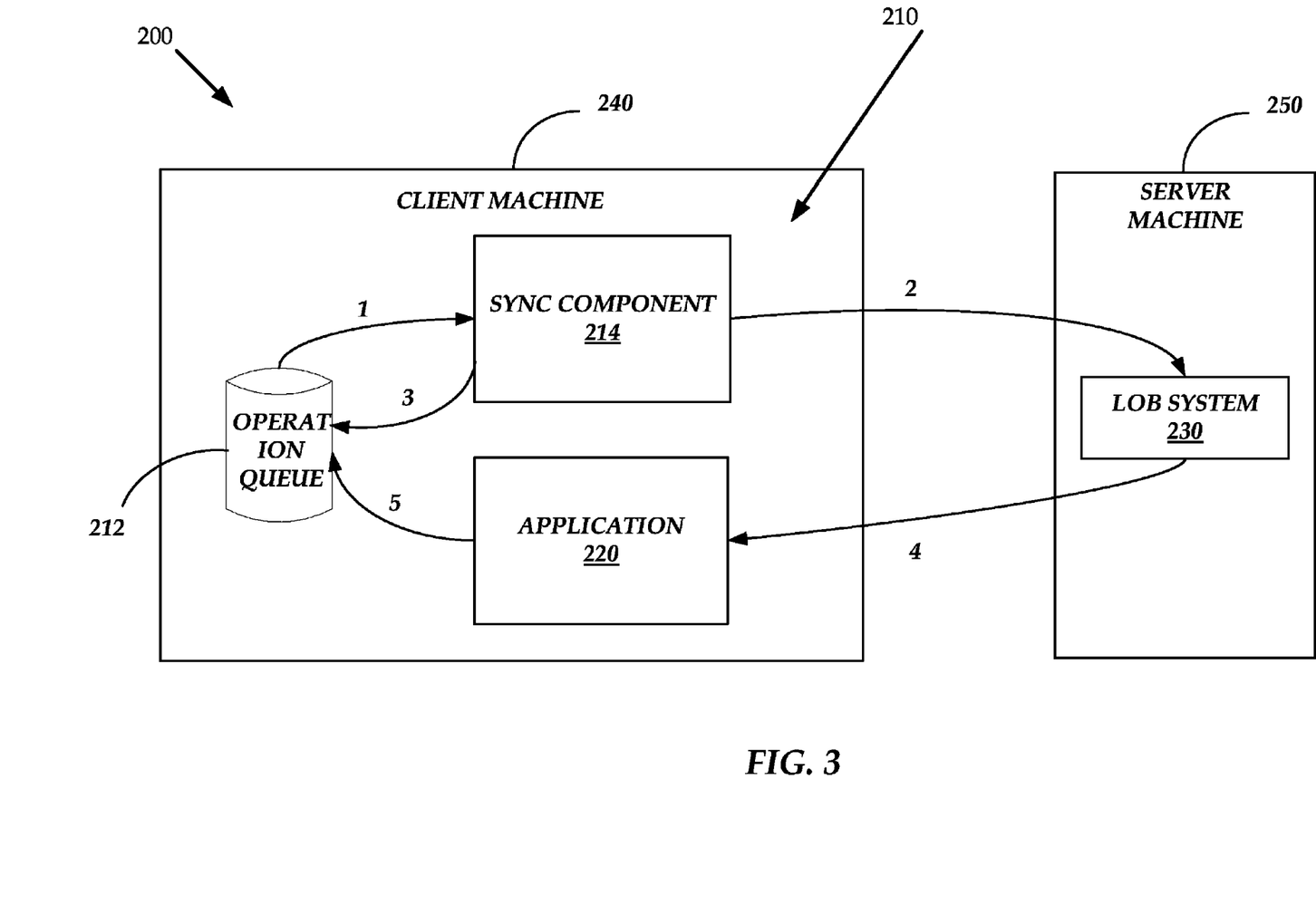
FIGS. 3-4 are simplified illustrations of leveraging synchronous communication protocols to enable asynchronous application and LOB behaviors where the application and the application platform may run on a client machine.
Figure 4:
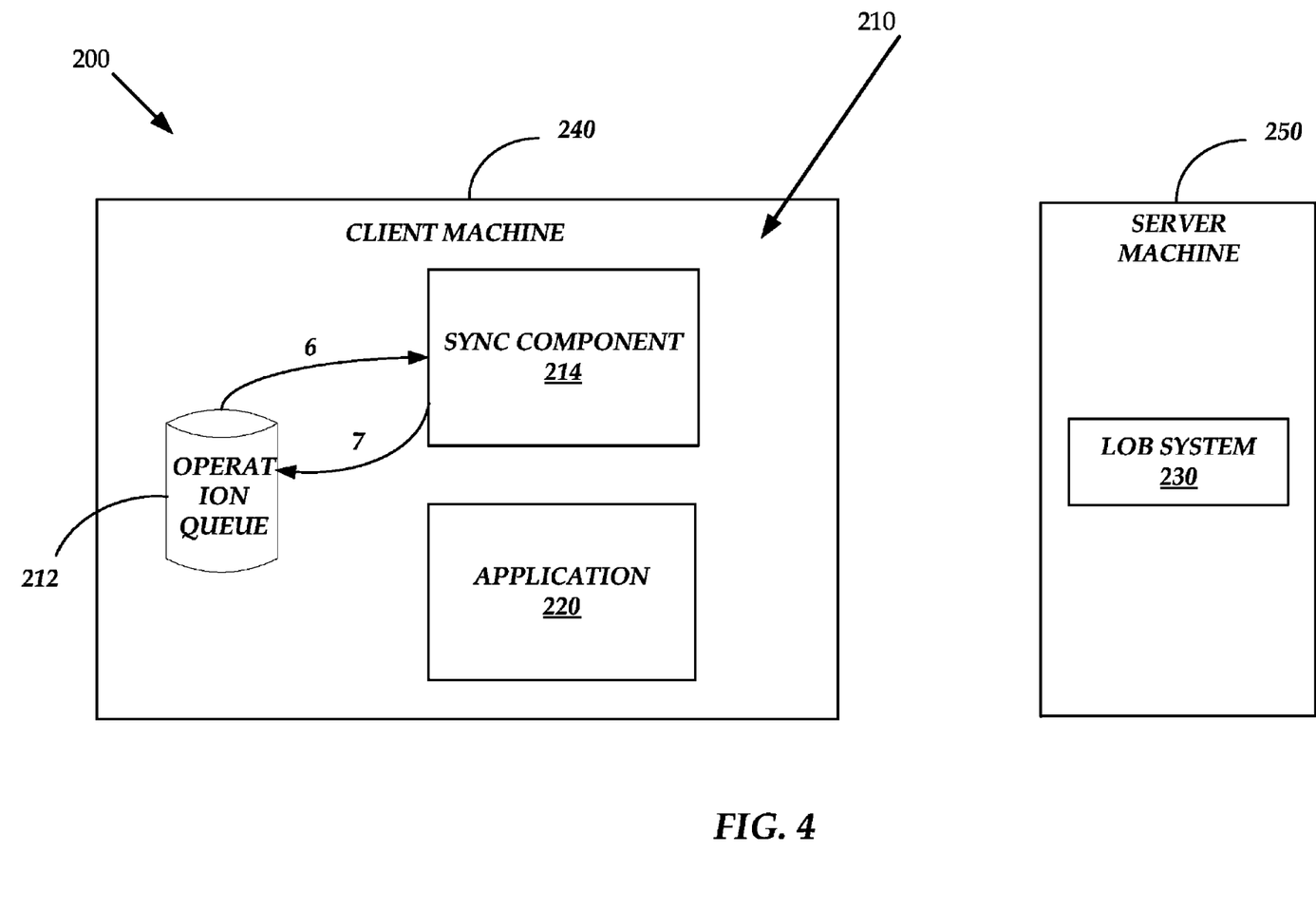

FIGS. 3-4 are simplified illustrations of leveraging synchronous communication protocols to enable asynchronous application and LOB behaviors where the application 220 and the application platform 210 may run on a client machine 240. According to one embodiment, the applications 220 and the application platform 210 may run on a client machine 220. The LOB system 230 may run on a server machine 240. Alternatively, the application platform 210 may run on both the client machine 240 and the server machine 250.

Referring to FIG. 3, the application 220 may initiate operations to the LOB system 230. The application operations may be queued up in the operation queue on the client machine 240 when the client machine 240 is off-line, and may be synchronized or replayed to the LOB system 230 when the client machine 240 comes back on-line. According to one embodiment, in step 1 illustrated in FIG. 3, a sync component 214 in the application platform 210 may retrieve the operation information from the operation queue 212.

Then in step 2, the sync component 214 may request an execution of an operation in the operation queue 212 against the LOB system 230. The LOB system 230 may return only a technical acknowledgement back. At this point, the operation may have not been completed yet.

In step 3, the sync component 214 may update the status of the operation in the operation queue 212 to a pending state. The pending state may indicate that the operation has not been completed yet. The application 220 may know that the request for the operation has been submitted and the operation has not been completed yet.

In step 4, the application 220 may learn from the LOB system 230 when the operation has been completed, and then the application 220 may retrieve the appropriate data from the LOB system 230.

In step 5, the application 220 may then update the operation queue 212 according to the response from the LOB system 230. The updating may include updating operation status and authoritative data. For an application that tracks and understands a pending state, the application may correlate the result in step 5 to the request in step 1. For an application 220 that does not track or understand the pending state, the application may only communicate to the application platform the request submitted in step 3 and may only show the response in step 5 as an unrelated, uncorrelated event.

Referring to FIG. 4, in step 6, the sync component 214 may retrieve information from the operation queue 212 about an operation in the pending status that has been in that status for longer than a pre-determined time-out period. In step 7, the sync component 214 may update the status of the operation in the operation queue, to a "failed" status after the operation has been in the pending status for longer than the pre-determined time-out period.

Figure 5:
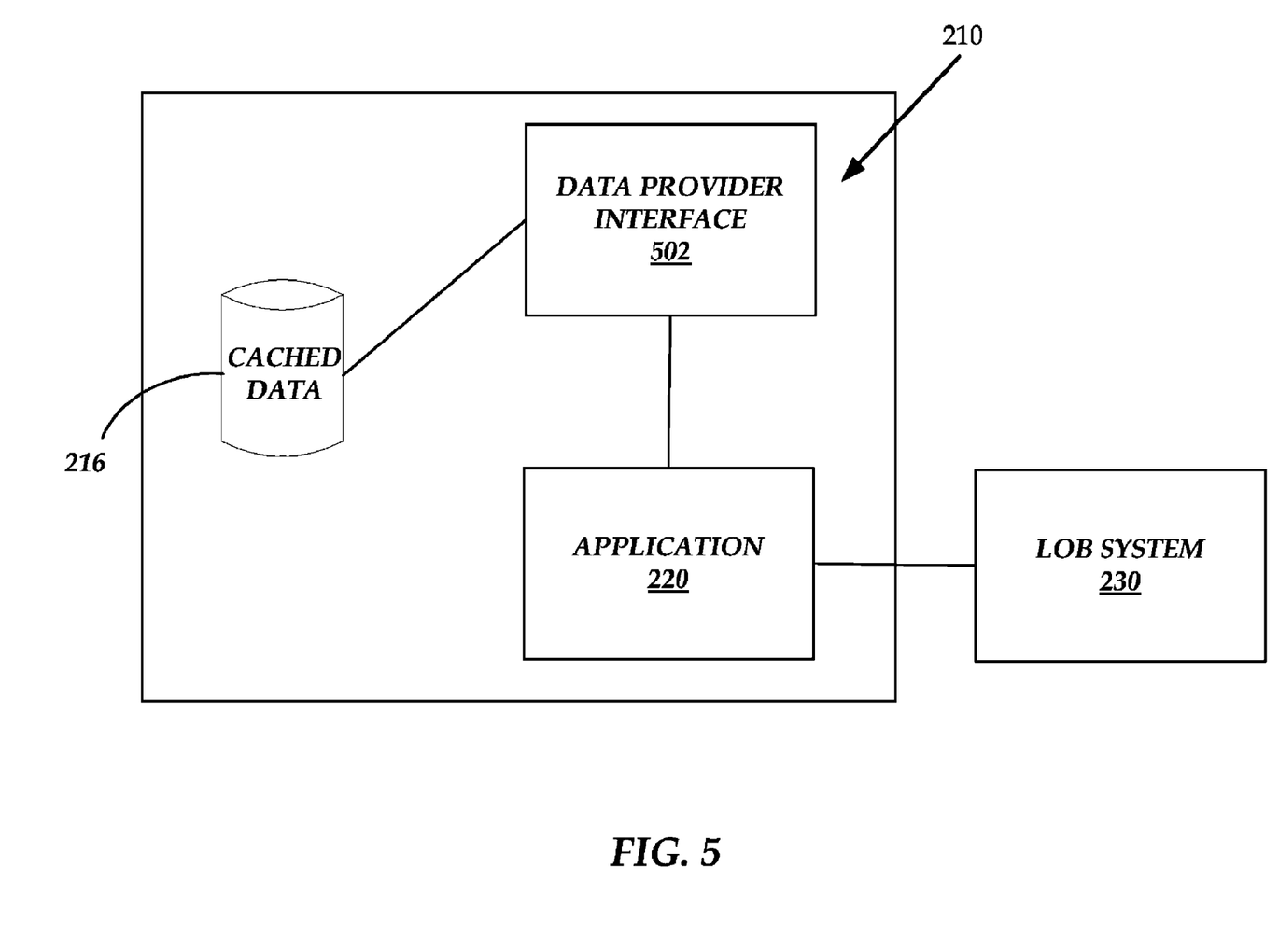
FIG. 5 is a simplified illustration of allowing an application to control authoritative data exchange between an application platform and a LOB system.

FIG. 5 is a simplified illustration of allowing an application 220 to control authoritative data exchange between an application platform 210 and a LOB system 230. The application 220 may communicate to the application platform 210 and update locally cached authoritative data 216 when authoritative data from the LOB system 230 is available. The authoritative data may be the data in the LOB system 230 that the application 220 and the application platform 210 work with. Instead of periodic refresh of authoritative objects and their content, the application 220 may communicate to the application platform 210 when the authoritative data is available.

According to one embodiment, the application platform 210 may include a data provider interface 502 for the locally cached authoritative data 216. The data provider interface 502 may be arranged and configured to access and update the locally cached authoritative data 216. The application platform 210 may assume that the data provided through the data provider interface 502 is authoritative LOB data.

The application 220 may update the locally cached authoritative data 216 asynchronously through the data provider interface 502. The application 220 may update the locally cached authoritative data 216 asynchronously based on events that may occur outside the application platform 210 at the application level. The application 220 may provide the LOB data immediately as soon as the related authoritative data is available in the LOB system 230. The application platform 210 may not have to go through the periodic cache refresh to fill up the authoritative data. When the application 220 knows events that can affect the authoritative data, the application 220 may communicate to the application platform 210 and update the authoritative data directly through the data provider interface 502. The authoritative data itself may be obtained through the LOB system 203 directly via events or other means. According to another embodiment, the locally cached authoritative data 216 may be updated synchronously using the periodic cache refresh as well.

Figure 6:
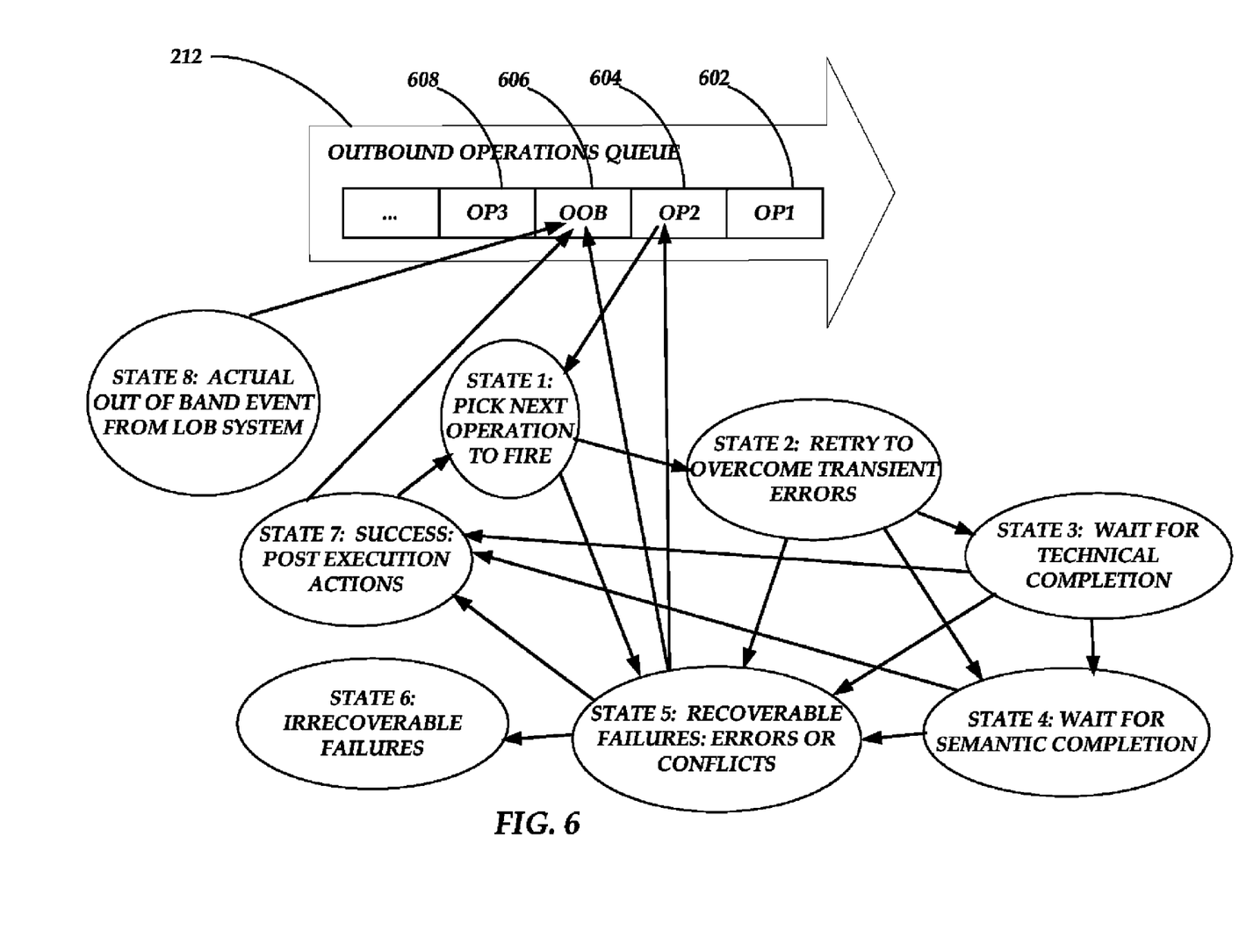
FIG. 6 is a simplified illustration of introducing out-of-band exceptions into a normal request-reply processing channel in an application.

FIG. 6 is a simplified illustration of introducing out-of-band exceptions into a normal request-reply processing channel in the application 220. Referring to FIGS. 2 and 6, the application 220 may introduce exceptions corresponding to out-of-band changes. The out-of-band changes are changes or events that are outside the control of the application 220 or the application platform 210. The out-of-band exceptions may have custom exception handling logic to process these changes.

According to one embodiment, the application 220 may create an exception without executing an operation, and introduce it into the application platform 210 as if it were an exception that was the result of a real operation invocation. The introducing of exceptions therefore may provide the application 220 and the application platform 210 ability to process out-of-band changes as if they were results of operations that were invoked on the client.

The application 220 may provide an exception-handler for the exceptions such that the handler can be invoked even when the entire application itself is not currently running. This gives the application 220 and the application platform 210 ability to have custom handling logic created by applications that know what to do for specific LOB exceptions. Moreover, since the custom handling logic may run even without the rest of the business logic of the application running, it is possible for a down-level application to understand why the application platform 210 takes certain actions, as opposed to just seeing the end results and not knowing what causes that to happen.

Referring to FIG. 6, the operation queue 212 may have various operations to be submitted. The operation Op1 602 is an operation that has already been submitted successfully. The operation Op2 604 is an operation that is being submitted now. The out-of-band exception OOB 606 is an exception that introduces an out-of-band change. The operation Op3 608 is an operation that is not yet submitted. According to one embodiment, there may be three possible ways of adding the OOB exception 606 to the application 220 and then the operation queue 212. The first way is as a result of the recoverable failure state 5. The second one is as a result of post successful operation completion actions state 7 where the request processing channel routinely checks for exception conditions outside of the current operation being executed. The third way is as a result of a truly asynchronous event that communicates to the application 220 about the exceptional condition, for example, via some business alert or other kinds of instant communication, in state 8.

Once the OOB exception 606 is introduced, it may first be picked for execution normally in state 1. Next, the OOB exception 606 may immediately move to the recoverable error state 5 directly. The out-of-band exception OOB 606 will not have to be actually sent to the LOB system 230. Other than this, the application 220 and the application platform 210 proceed as usual, including adding additional OOB exceptions. After all OOB exceptions are handled, state 7 may be reached for post execution actions, which may go on as usual.

OOB exception execution as modeled and illustrated in FIG. 6 advantageously achieves submitting an operation directly to the LOB system 230, but also leverages all error handling and post-processing capabilities built into the client operation execution pipeline. According to one embodiment, the OOB exception 606 may be introduced into the middle of the operation pipe after the current operation is executed. The OOB exception 606 may also be introduced after all operations that are independent of the OOB exception in the output queue.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A method of leveraging synchronous communication protocols to enable asynchronous application and line of business ("LOB") behaviors, comprising:
   initiating an operation through an application from a client machine to a LOB system, the operation comprising a version change in at least one of a plurality of objects dealt with by the application, the version change comprising a metadata update or a data migration;
   requesting an execution of the operation in the LOB system through an application platform, wherein upon execution of the operation, the LOB system exposes actions that trigger analytical computation, wherein the LOB system further creates summaries of results that are presented to a user, wherein the analytical computation and the creation of the results summaries are scheduled to run at only specific intervals in the LOB system, thereby resulting in a non-immediate response back to the application;
   updating the status of the operation to a pending state, the pending state indicating that the operation has not been completed yet, wherein the application communicates an upcoming update to the status of the operation, to the application platform, prior to updating the status of the operation to the pending state;
   receiving a response from the LOB system indicating that the operation has been completed;
   updating the status of the operation to a complete state, the complete state indicating that the operation has been completed; and
   introducing exceptions corresponding to out-of-band changes, the out-of-band changes comprising changes outside of the control of the application platform, the exceptions having custom exception handling logic to process the out-of-band changes as operations results that were invoked on the client machine, the exceptions being introduced as a result of a recoverable failure state; and
   providing exception-handler codes for the exceptions such that an exception handler can be invoked even when the entire application itself is not currently running.

2. The method of claim 1, further comprising:
   retrieving information from an operation queue about the operation in the pending status for a pre-determined time-out period; and
   updating the status of the operation to a failed status after the pre-determined time-out period expires.

3. The method of claim 1, wherein the application knows how to track the operation that has a pending state and wherein the application platform holds off on operations dependent upon the pending operation when the pending operation is not complete.

4. The method of claim 1, wherein the application does not know how to track the operation that has a pending state and wherein the application platform ignores the pending state of the operation and proceeds to other operations.

5. The method of claim 1, further comprising:
   updating cached authoritative data through a data provider interface when authoritative data from the LOB system is available.

6. The method of claim 5, wherein the application knows events that affect the authoritative data.

7. A method of leveraging synchronous communication protocols to enable asynchronous application and LOB behaviors, comprising:
   updating cached authoritative data in an application platform through a data provider interface when authoritative data from a LOB system is available, wherein a application knows events that affect the authoritative data;
   initiating an operation through the application from a client machine to the LOB system, the operation comprising a version change in at least one of a plurality of objects dealt with by the application, the version change comprising a metadata update or a data migration;
   requesting an execution of the operation in the LOB system through the application platform, wherein upon execution of the operation, the LOB system exposes actions that trigger analytical computation, wherein the LOB system further creates summaries of results that are presented to a user, wherein the analytical computation and the creation of the results summaries are scheduled to run at only specific intervals in the LOB system, thereby resulting in a non-immediate response back to the application;
   updating the status of the operation to a pending state, the pending state indicating that the operation has not been completed yet, wherein the application communicates an upcoming update to the status of the operation, to the application platform, prior to updating the status of the operation to the pending state;
   receiving a response from the LOB system indicating that the operation has been completed;
   updating the status of the operation to a complete state, the complete state indicating that the operation has been completed;
   introducing exceptions corresponding to out-of-band changes, the out-of-band changes comprising changes outside of the control of the application platform, the exceptions having custom exception handling logic to process the out-of-band changes as operations results that were invoked on the client machine, the exceptions being introduced as a result of a recoverable failure state; and
   providing exception-handler codes for the exceptions such that an exception handler can be invoked even when the entire application itself is not currently running.

8. The method of claim 7, further comprising:
   retrieving information from an operation queue about the operation in the pending status for a predetermined time-out period; and
   updating the status of the operation to a failed status after the pre-determined time-out period expires.

9. The method of claim 7, wherein the application knows how to track the operation that has a pending state and wherein the application platform holds off on operations dependent upon the pending operation when the pending operation is not complete.

10. The method of claim 7, wherein the application does not know how to track the operation that has a pending state and wherein the application platform ignores the pending state of the operation and proceeds to other operations.

11. One or more computer-readable storage media, wherein the one or more computer-readable storage media does not consist of a propagated data signal, the one or more computer-storage media comprising at least one of a memory device and a storage device, the one or more computer-readable storage media containing computer executable instructions which when executed by a computer perform a method of leveraging synchronous communication protocols to enable asynchronous application and LOB behaviors, comprising:

initiating an operation through the application from a client machine to a LOB system, the operation comprising a version change in at least one of a plurality of objects dealt with by the application, the version change comprising a metadata update or a data migration;

requesting an execution of the operation in the LOB system through an application platform, wherein upon execution of the operation, the LOB system exposes actions that trigger analytical computation, wherein the LOB system further creates summaries of results that are presented to a user, wherein the analytical computation and the creation of the results summaries are scheduled to run at only specific intervals in the LOB system, thereby resulting in a non-immediate response back to the application;

updating the status of the operation to a pending state, the pending state indicating that the operation has not been completed yet, wherein the application communicates an upcoming update to the status of the operation, to the application platform, prior to updating the status of the operation to the pending state;

receiving a response from the LOB system indicating that the operation has been completed;

updating the status of the operation to a complete state, the complete state indicating that the operation has been completed;

introducing exceptions corresponding to out-of-band changes, the out-of-band changes comprising changes outside of the control of the application platform, the exceptions having custom exception handling logic to process the out-of-band changes as operations results that were invoked on the client machine, the exceptions being introduced as a result of a recoverable failure state; and providing exception-handler codes for the exceptions such that an exception handler can be invoked even when the entire application itself is not currently running.

12. The one or more computer-readable storage media of claim 11, further comprising:

retrieving information from an operation queue about the operation in the pending status for a predetermined time-out period; and updating the status of the operation to a failed status after the pre-determined time-out period expires.

13. The one or more computer-readable storage media of claim 11, wherein the application knows how to track the operation that has a pending state and wherein the application platform holds off on operations dependent upon the operation when the pending operation is not complete.

14. The one or more computer-readable storage media of claim 11, wherein the application does not know how to track the operation that has a pending state and wherein the application platform ignores the pending state of the operation and proceeds to other operations.

15. The one or more computer-readable storage media of claim 11, further comprising:

updating cached authoritative data through a data provider interface when authoritative data from a LOB system is available.

16. The one or more computer-readable storage media of claim 15, wherein the application knows events that affect the authoritative data.

* * * * *